Jan. 20, 1959 E. L. STERNER 2,870,326

DEVICE FOR SELECTING SIGNAL OF GREATEST ENERGY

Filed May 14, 1956

INVENTOR.
EVERETT L. STERNER
BY Moody and Harsha
ATTORNEYS

United States Patent Office 2,870,326

Patented Jan. 20, 1959

2,870,326

DEVICE FOR SELECTING SIGNAL OF GREATEST ENERGY

Everett L. Sterner, Dallas, Tex., assignor to Collins Radio Company, Cedar Rapids, Iowa, a corporation of Iowa Application May 14, 1956, Serial No. 584,801

4 Claims. (Cl. 250—6)

Figures 1, 2:
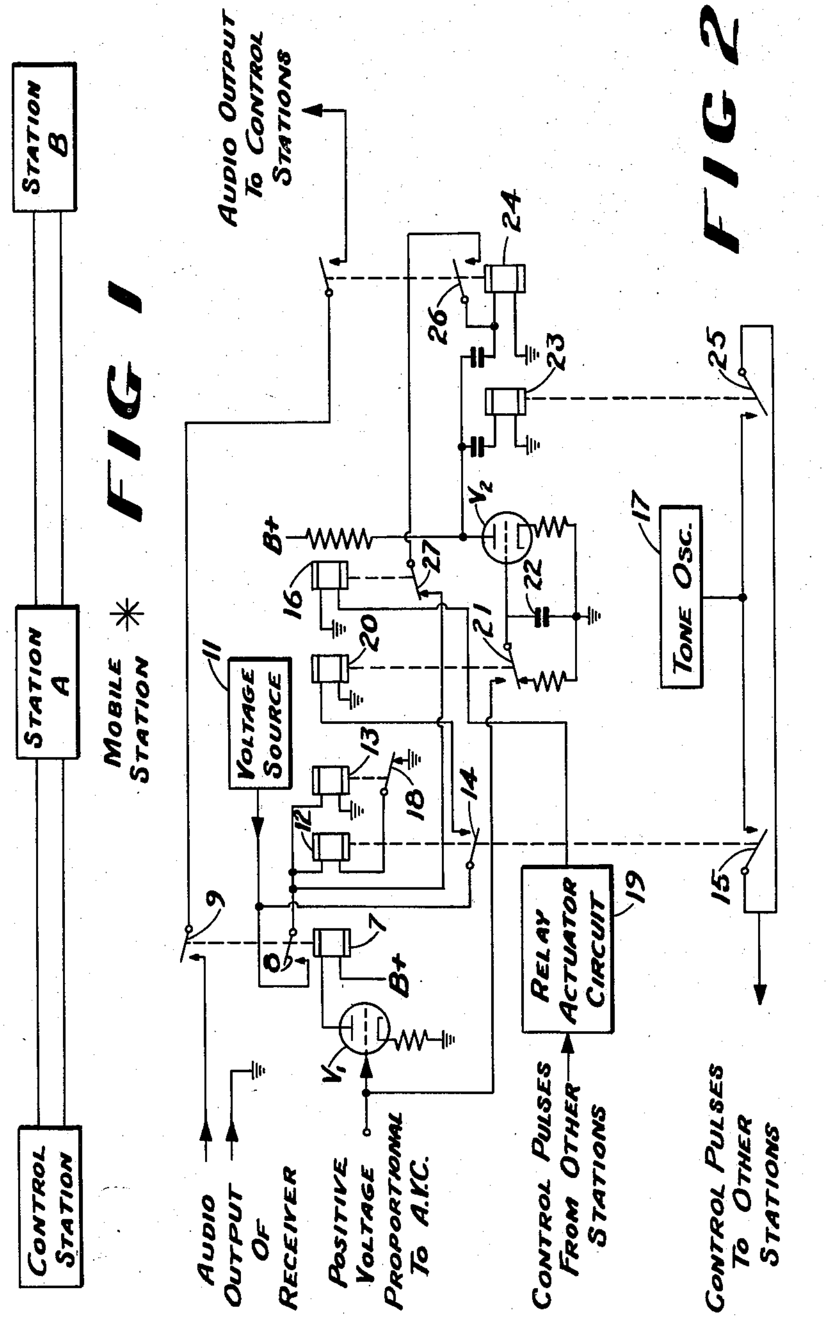

This invention relates to a selection system and more particularly to a system for selecting the voltage having the greatest value from a plurality of voltages.

Where a series of transmitting-receiving stations is used as a communication system with a control station and relay or remote stations at widely separated points, some means is necessary to insure that the control station receives the strongest possible signal. For example, if personnel in a mobile station are calling the control station from a distance such that the signals from the remote station must be picked up and relayed by at least one remote station, the signals should be relayed by the remote station receiving the strongest signal from the mobile station. This invention is useful in a two-way system of communication between a control station and a number of remote stations. The communication system using this invention should be capable of handling pulses of a low repetition rate and should cause only reasonable degradation of the signal. Thus, either a microwave system or a wire line system of communications may be used with this invention and meet the above-required qualifications.

It is a feature of this invention that the signals received at a number of remote stations from a mobile station will be transmitted to the control station by the particular remote station receiving the strongest signal.

It is another feature of this invention that only one remote station will transmit a particular received signal to the control station at any one instant.

It is a still further feature of this invention that it is a system for selecting the greatest voltage from a plurality of voltages at a plurality of stations, which is economical.

It is still another feature of this invention that the selection system is dependent upon the strength of the individual signals received at each of the remote stations.

It is another feature of this invention that the signal having the greatest value is easily selected from a plurality of signals having varied values.

It is an object of this invention to provide a two-way communication system with an automatic control for connecting the strongest signal received by any remote station to the control station.

It is another object of this invention to provide a two-way communication system wherein a plurality of unmanned remote stations may be connected to a control station by the strongest signal received by any one of the remote stations.

It is a further object of this invention to provide a means for selecting the signal of greatest energy from a plurality of signals where the signals may be remotely related to each other.

These and other objects of this invention will become apparent when the following description is read in conjunction with the accompanying drawings, in which:

Figures 1 is a block diagram of a two-way control system including a mobile station, and Figure 2 is a schematic diagram showing an embodiment of this invention employed in the two-way communication system shown in Figure 1.

If the mobile station in Figure 1 desires to transmit a message to the control station, a message must be relayed by at least one of two remote stations. It is understood, of course, that there may be a great many more remote stations, such as stations A and B. It is desirable that only one remote station, either A or B, should transmit the signal from the remote station to the control station. This should be the station which receives the strongest signal from the mobile station. The strongest signal received at any remote station is determined by this invention, an embodiment of which is shown in Figure 2. This invention is included in the equipment located at each and every remote station.

The audio output of the remote receiver having the greatest signal strength is relayed as the audio output to the control station in the following manner. It is obvious that the described automatic operations occur at each remote station. It is equally obvious that a small time difference exists between the steps described at each of the different remote stations.

Referring now to Figure 2, a positive voltage proportional to the automatic volume control signal of the receiver is applied to the grid of tube $V_1$. This allows tube $V_1$ to conduct since it is normally biased to be nonconducting. Current flow in tube $V_1$ also flows in the winding of relay 7 and operates relay 7. Operation of relay 7 closes the contacts 8 and 9. The closing of the contact 8 applies a voltage from the source 11 to the windings of relays 12 and 13. Relay 13 is a time delay relay with a specified delay time before operation. This time delay is correlated to the amount of voltage applied from source 11 so that relay 13 will always operate a specified number of seconds or portions thereof after the operation of relay 12. Relay 12 operates immediately upon the closure of the contact 8. The operation of relay 12 closes the contacts 14 and 15. The closing of the contact 14 applies the voltage from the voltage source 11 to the winding of relay 20 and operates relay 20. The closing of contact 15 applies a first control pulse from the tone oscillator 17 to the other remote stations. The tone oscillator 17 may be replaced by a direct current signal, dependent upon whether a microwave or a wire line communication system is being utilized. The duration of this control pulse is determined by the time delay between the operation of relay 12 and relay 13. When the predetermined time has elapsed, relay 13 operates and opens contact 18. When contact 18 opens, the ground connection is removed from the winding of relay 12 and releases relay 12. The release of relay 12 opens contacts 14 and 15 and the signal from the tone oscillator 17 is no longer applied to the other remote stations. Since a similar process has been going on in identical selection systems in the other remote stations, control pulses from all remote stations are now ended. This pulse is considered a time reference base, since the time from its start to its finish is accurately measured by the time delay of relay 13.

These time reference pulses or first control pulses are applied to the relay actuator circuits 19 in each remote station during the period relay 12 is operated. The relay actuator circuit 19 develops the control pulses as voltages which are applied to the winding of relay 16 and operate relay 16. The operation of relay 20 closes contact 21. The closing of contact 21 applies the positive voltage proportional to the automatic volume control voltage to the grid of tube $V_2$. Tube $V_2$ is normally biased to cut-off and there is normally no charge on the condenser 22. With the closing of contact 21 and the application of the positive voltage to the grid of tube $V_2$, conduction occurs in tube $V_2$. The current flow through the windings of relays 23 and 24 resulting from the conduction in tube $V_2$ operates relays 23 and 24. The amplitude of the voltage applied to the grid of tube $V_2$ should be many times the voltage required to drive the tube to saturation, thereby assuring an output pulse of short duration. The operation of relay 23 closes the contact 25 and applies the tone from the tone oscillator 17 as a second control pulse to other stations. However, this second control pulse performs no active function since it must be remembered that the first control pulses are being simultaneously applied.

The importance of the timing is specifically related to the charging of the condenser 22. The time reference signal gives an accurate time base for the charging of condenser 22 so that the variable factor is the amount of voltage from the positive voltage source proportional to the automatic volume control. When contact 21 is closed, condenser 22 is being charged to the maximum value of the positive voltage. The voltage on condenser 22 will determine the time tube $V_2$ will conduct during the discharge of condenser 22. At this time the first control pulses have ended as time delay relay 13 has operated. A third pulse, or the third control pulse produced by the operation of relay 23, is now important. This pulse occurs when the condenser 22 has discharged to a point where the grid voltage of tube $V_2$ is again between the value of cut-off and the saturation value. There is thus a control pulse generated both during the charging of the condenser 22 and the discharging of the condenser 22. The third control pulse resulting from the discharging of condenser 22 operates relays 23 and 24 a second time.

The time of occurrence of the third pulse with relation to the time reference pulse is dependent upon the charge originally given the condenser 22. The pulse occurs when a specified value of voltage occurs during the discharging of condenser 22 and the pulse is connected to the relay actuator circuit 19 at the other remote stations. When the third control pulse is received at the other remote stations, relay actuator circuit 19 applies voltage to the winding of relay 16, thereby operating relay 16. The operation of relay 16 opens the holding connection 26 of relay 24, thereby removing the audio signal of the receiver at the remote station receiving the third control pulse from the line or output to the control station. It is seen that the charging voltage on condenser 22 controls the third control pulse which determines which remote station remains connected to the control station. The remote station which produces the third control pulse latest in time is the station having the received signal of greatest energy. This remote station disconnects the receivers at the remainder of the remote stations from the control station by the operation of this invention.

It is seen that the time of the third control pulse or control signal is directly related to the strength of the automatic volume control signal. This is because the amount of charge on each of the condensers 22 at each remote station is directly proportional to the amount of voltage applied, since the time of application for each station is equal. Thus a system for selecting the signal having the greatest value from a plurality of signals with varied values is completed.

Although this invention has been described with respect to a particular embodiment thereof, it is not to be so limited, as changes and modifications may be made therein which are within the full intended scope of the invention as defined by the appended claims.

What is claimed is:

1. A selection system for selecting the signal having the greatest energy level from a plurality of individual signals at a plurality of remote stations and connecting said selected signal to a control station including at each remote station means for receiving signals having intelligence thereon, a positive voltage proportional to the automatic volume control signal of the receiver, a voltage source, a timing means, a source of distinctive control signals, means interconnecting said remote stations and said control station, pulse-generating means for generating pulses spaced in proportion to said positive voltage, means including said voltage source for energizing said timing means responsive to said positive voltage, a first means for applying said control signals to said interconnecting means and substantially simultaneously connecting said positive voltage to said pulse-generating means, said first means controlled by said timing means, a second means for connecting said control signals to said interconnecting means, said second means controlled by said pulse-generating means, said timing means controlling said first means to substantially simultaneously disconnect said control signals from said interconnecting means and remove said positive voltage from said pulse-generating means, said pulse-generating means producing pulses at a subsequent time determined by said positive voltage, means responsive to said pulse for connecting the respective received signals to the control station, and means responsive to said control signals to disconnect the received signals from said control station whereby only the remote station generating its control signal latest in time connects its received signal to the control station.

2. A selection system for selecting the signal having the greatest energy level from a plurality of individual signals at a plurality of remote stations and connecting said selected signal to a control station including at each remote station means for receiving signals having intelligence thereon, a positive voltage proportional to the automatic volume control signal of the receiver, a voltage source, a timing means comprising a time delay relay, a source of distinctive control signals, means interconnecting said remote stations and said control station, pulse-generating means for generating pulses spaced in proportion to said positive voltage, means including said voltage source for energizing said timing means responsive to said positive voltage, a first means for applying said control signals to said interconnecting means and substantially simultaneously connecting said positive voltage to said pulse-generating means, said first means controlled by said timing means, a second means for connecting said control signals to said interconnecting means, said second means controlled by said pulse-generating means, said timing means controlling said first means to substantially simultaneously disconnect said control signals from said interconnecting means and remove said positive voltage from said pulse-generating means, said pulse-generating means producing a pulse at a subsequent time determined by said positive voltage, means responsive to said pulse for connecting the respective received signals to the control station, and means responsive to said control signals to disconnect the received signals from said control station whereby only the remote station generating its control signal latest in time connects its received signal to the control station.

3. A selection system for selecting the signal having the greatest energy level from a plurality of individual signals at a plurality of remote stations and connecting said selected signal to a control station, including at each remote station means for receiving signals having intelligence thereon, a positive voltage proportional to the automatic volume control signal of the receiver, a voltage source, a timing means, a source of distinctive control signals, means interconnecting said remote stations and said control station, pulse-generating means for generating pulses spaced in proportion to said positive voltage, said pulse generating means comprising an amplifier, a capacitive input thereto and a resistive element for discharging said capacitive input upon the operation of said timing means, means including said voltage source, an electron discharge device and a relay for energizing said timing means responsive to said positive voltage, a first means for applying said control signals to said interconnecting means and substantially simultaneously connecting said positive voltage to said pulse-generating means, said first means controlled by said timing means, a second means for connecting said control signals to said interconnecting means, said second means controlled by said pulse-generating means, said timing means controlling said first means to substantially simultaneously disconnect said control signals from said interconnecting means and remove said positive voltage from said pulse-generating means, said pulse-generating means producing a pulse at a subsequent time determined by said positive voltage, means responsive to said pulse for connecting the respective received signals to the control station, and means responsive to said control signals to disconnect the received signals from said control station whereby the remote station generating the control signal latest in time connects its received signal to the control station.

4. A selection system for selecting the signal having the greatest energy level from a plurality of individual signals at a plurality of remote stations and connecting said selected signal to a control station including at each remote station means for receiving signals having intelligence thereon, a positive voltage proportional to the automatic volume control signal of the receiver, a voltage source, a timing means comprising a time delay relay, a source of distinctive control signals, means interconnecting said remote stations and said control station, pulse-generating means for generating pulses spaced in proportion to said positive voltage, said pulse generating means comprising an amplifier with a capacitive input thereto, and a resistive element for discharging said capacitive input upon the operation of said timing means, means including said voltage source, an electron discharge device and a first relay for energizing said timing means responsive to said positive voltage, a first means for applying said control signals to said interconnecting means and substantially simultaneously connecting said positive voltage to said pulse-generating means, said first means controlled by said timing means, a second means comprising a second relay for connecting said control signals to said interconnecting means, said second means controlled by said pulse-generating means, said timing means controlling said first means to substantially simultaneously disconnect said control signals from said interconnecting means and remove said positive voltage from said pulse-generating means, said pulse-generating means producing a pulse at a subsequent time determined by said positive voltage, means responsive to said pulse for connecting the respective received signals to the control station, and means including an actuator circuit and a third relay responsive to said control signals to disconnect the received signals from said control station whereby the remote station generating the control signal latest in time sends its received signal to the control station.

References Cited in the file of this patent

UNITED STATES PATENTS 2,734,131 Magnuski ---------------- Feb. 7, 1956